(12) United States Patent
Slagle et al.

(10) Patent No.: US 7,796,172 B1
(45) Date of Patent: Sep. 14, 2010

(54) METHOD AND APPARATUS FOR ELIMINATING IMAGE ARTIFACTS DUE TO DEFECTIVE IMAGER COLUMNS AND ROWS

(75) Inventors: Timothy M. Slagle, Mountain View, CA (US); Robert S. Hannebauer, Sunnyvale, CA (US); Richard B. Merrill, Woodside, CA (US); Peter J. Manca, Sunnyvale, CA (US)

(73) Assignee: Foveon, Inc., Santa Clara, CA (US)

( * ) Notice: Subject to any disclaimer, the term of this patent is extended or adjusted under 35 U.S.C. 154(b) by 1926 days.

(21) Appl. No.: 10/794,703

(22) Filed: Mar. 4, 2004

(51) Int. Cl.
*H04N 3/14* (2006.01)
*H04N 5/335* (2006.01)
(52) U.S. Cl. .................. 348/294; 348/298; 348/302; 348/312
(58) Field of Classification Search .......... 348/246, 348/247, 241, 243, 294, 296, 298, 302, 312; 250/208.1; 257/291, 292
See application file for complete search history.

(56) References Cited

U.S. PATENT DOCUMENTS 5,886,353 A * 3/1999 Spivey et al. .......... 250/370.09
6,888,568 B1 * 5/2005 Neter .................... 348/222.1
7,307,659 B2 * 12/2007 Gorder et al. ............ 348/241
2002/0158977 A1 * 10/2002 Hamilton, Jr. ........... 348/246

* cited by examiner

*Primary Examiner*—Yogesh K Aggarwal
(74) *Attorney, Agent, or Firm*—Lewis and Roca LLP (57) ABSTRACT

In a readout bus architecture having a first column, a readout means is coupled to a photodetector and configured to transfer charge from the photodetector. A select means is coupled to the photodetector and is configured to transfer charge from the photodetector. An address circuit is coupled to the first column through the select means and is configured to generate and decode an address and turn on the select means for the first column if the address matched the first column and if the address circuit received a corrected enable signal indicating that the first column is not defective. A correction circuit is coupled to the address circuit and is configured to generate the corrected enable signal indicating that the first column is not defective if the correction circuit determined that the first column is not defective.

18 Claims, 9 Drawing Sheets

METHOD AND APPARATUS FOR ELIMINATING IMAGE ARTIFACTS DUE TO DEFECTIVE IMAGER COLUMNS AND ROWS

BACKGROUND OF THE INVENTION

1. Field of the Invention

The invention relates to image sensors. More particularly, the invention relates to correcting readout from a defective column or row.

2. The State of the Art

One problem camera systems have with image capture is correcting defective columns on the image sensor. The problem is worsened by a charge-sharing readout bus architecture because a defective column can affect the readout for adjacent, non-defective columns. If the defect is limited to the linear range of operation of the imager, then the defect can be corrected with image processing, but defective columns typically drive the signal out of the linear region. When a column filter is applied, there is still an artifact in the final image, around the bad column, due to the errors introduced by the non-linearity. Consequently, the image processing software has difficulty correcting for defective columns. One solution is to select chips with no defective columns, however this reduces chip yield and increases cost of the imagers.

Defective columns may be caused by localized nano-Amp (nA) level junction leakage which do not cause yield problems for other CMOS products, therefore there is less incentive to CMOS manufacturers to reduce this type of failure.

Figure 1A:
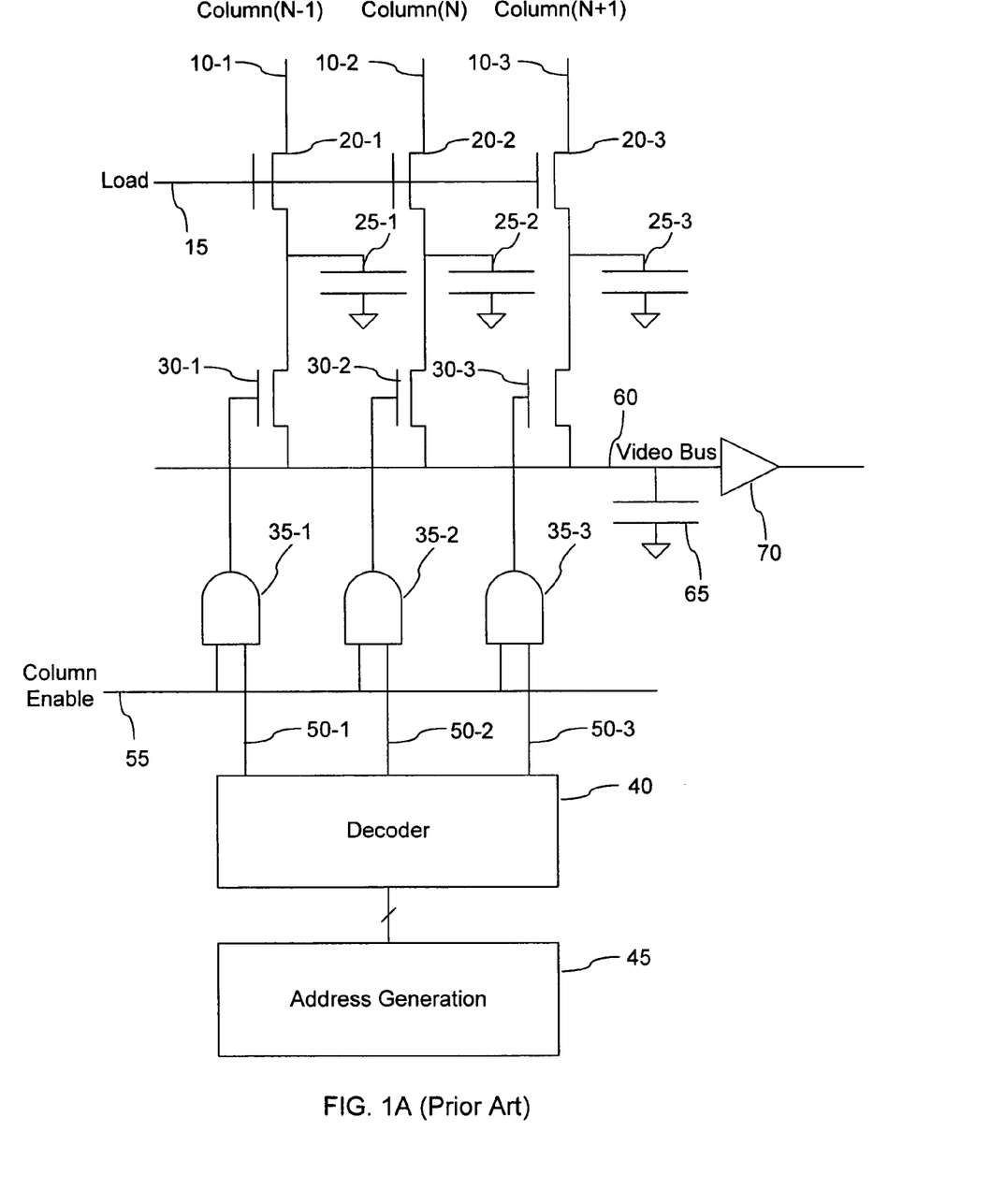
FIG. 1a is a schematic diagram illustrating one prior art example for reading data from columns of an imager chip onto a video bus.

FIG. 1a is a schematic diagram illustrating one prior art example for reading data from columns of an imager chip onto a video bus. FIG. 1 represents part of the column outputs for a typical sensor. Columns 10-1, 10-2, and 10-3 connect to data inputs, for example photodetectors and amplifiers (not shown). Load line 15 is connected to the gate of storage transistors 20-1, 20-2, and 20-3. When load line 15 is high, storage transistors 20 are biased into an active state, or turned on, and voltage from columns 10-1, 10-2 and 10-3 charges storage capacitors 25-1, 25-2, and 25-3, respectively. When load line 15 goes low, storage transistors 20 are turned off and storage capacitors 25 hold a charge set by the column voltage sampled during the time load line 15 was high.

Select transistors 30-1, 30-2, and 30-3 are connected to storage capacitors 25 and AND gates 35-1, 35-2, and 35-3. AND gates 35 are each connected to decoder 40 and thereby to address generator 45. Address generator 45 generates an address for a particular column, which is sent to decoder 40. Decoder 40 then decodes the address and sends an output line high. For example, if address generator 45 generated the address for column 10-1, then decoder would drive line 50-1 to AND gate 35-1 to go high. If address generator 45 generated the address for column 10-2 then decoder would drive line 50-2 to AND gate 35-2 to go high, and line 50-3 to AND gate 35-3 for column 10-3.

If column enable 55 is also high, then whichever AND gate 35 has both inputs high will drive its output high and turn on select transistor 30. The charge on storage capacitor 25 redistributes through video bus 60 to video bus capacitor 65. After this redistribution, column enable 55 goes low, driving AND gate 35 low and turning off select transistor 30. Charge stabilizes on video bus capacitor 65 and can then be read out through buffer amplifier 70 to an output. The process is repeated for each column.

With respect to defective rows, a sequential readout pixel has less column outputs, but more row access wires. The row wires are low impedance nodes that are not susceptible to low level leakage, only hard shorts or opens that would cause failures with any CMOS product. A hard short on the row wires will cause global problems that may have an effect on image quality or other imager characteristics such as power consumption or gradients. For example, two rows shorted together should not be driven at opposite logic levels.

Figure 1B:
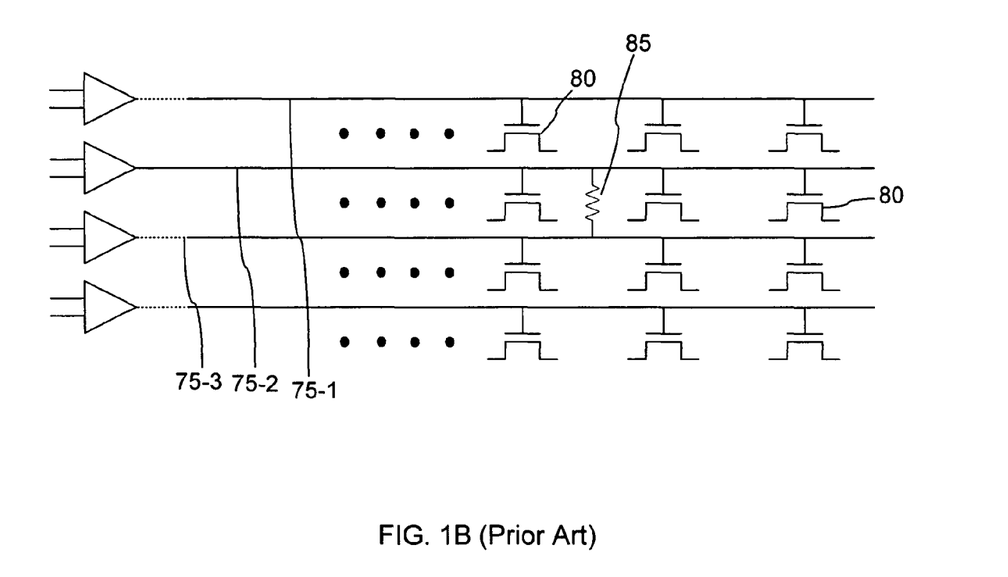
FIG. 1b is a schematic diagram illustrating one prior art example for reading data from rows of an imager chip.

FIG. 1b is a schematic diagram illustrating one prior art example for reading data from rows of an imager chip. Rows 75 connect to transistors 80, which connect to each of their respective columns (not shown). Row 75-1 is one example of a row with no defect. An assertion or deassertion on row 75-1 will affect each transistor coupled to row 75-1. Rows 75-2 and 75-3 illustrate one example of a shorting defect, where short 85 connects rows 75-2 and 75-3 together. Asserting one of the rows will also assert the other due to short 85, resulting in an incorrect readout for the pixels along both rows.

Figure 2:
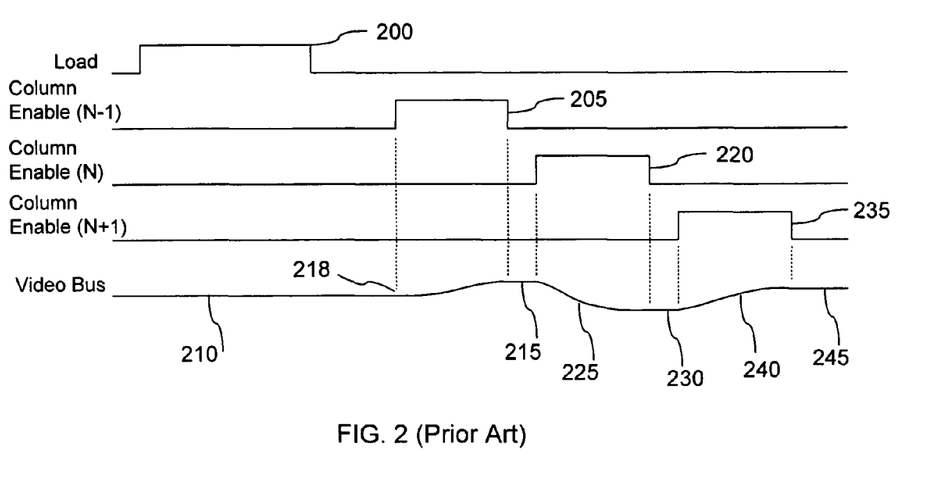
FIG. 2 is a prior art graph for the signal and charge levels while reading data, related to FIG. 1.

FIG. 2 is a prior art graph for the signal and voltage levels while reading data from columns, related to FIG. 1a. Pulse 200 represents high voltage on load line 15. Consequently, capacitors 25 store charge from columns 10. Charge storing, or voltage sampling, stops when pulse 200 goes low. Pulse 205 signals a readout from storage capacitor 25-1 on column 10-1 to video bus capacitor 65. Pulse 205 represents high voltage on column enable 55.

Video bus waveform 210 represents voltage across video bus capacitor 65. Column enable 55 goes low (low voltage), as represented by pulse 205 going low, and charge stops accumulating on video bus capacitor 65. Voltage on column 10-1 is determined by comparing the voltage on video bus 60 prior to pulse 205, for example point 218, with voltage on video bus 60 after pulse 205, for example point 215. This is one example of charge sharing.

Charge sharing operates as follows. For each row, all column lines are discharged to ground using the load device as a column reset switch. The column reset switch is then turned off and the row select line is activated for a predetermined length of time, connecting the amplifiers in the pixel sensors to the column lines, where they charge the column lines' capacitance. The voltages on the column lines approach the final value approximately logarithmically after the source follower transistor enters its sub-threshold regime, about 60 mV per common log unit of the length of time they are turned on.

After a predetermined time, the pixels are disconnected from the columns. The column lines are charged to voltages in a known predetermined relation to the signals at the inputs of the pixel sensor amplifiers, with random variations that depend on the particular amplifiers but not on the column lines. One column line at a time is then selected to be connected to the video bus, sharing the charges between the selected column line and the video bus, and thereby creating a very linear discrete-time filtered version of the sequence of column signals across the row, with little or no dependence on the rate or duration of the column select signals. The design and timing of the column decoder that drives the column select switches must be done with care, as known in the art, to assure that no glitches occur, because glitches may cause unwanted sharing of charge with columns that should not be selected.

Continuing with the example, pulse 220 signals readout for column 10-2, resulting in transition 225, in which the video bus voltage ends at point 230. Voltage on column 10-2 is determined by comparing voltage on video bus 60 at point 215 to voltage at point 230. Pulse 235 signals readout for column 10-3, resulting in transition 240 to point 245. Voltage on column 10-3 is determined by comparing voltage on video bus 60 at point 230 to voltage at point 245.

Figure 3:
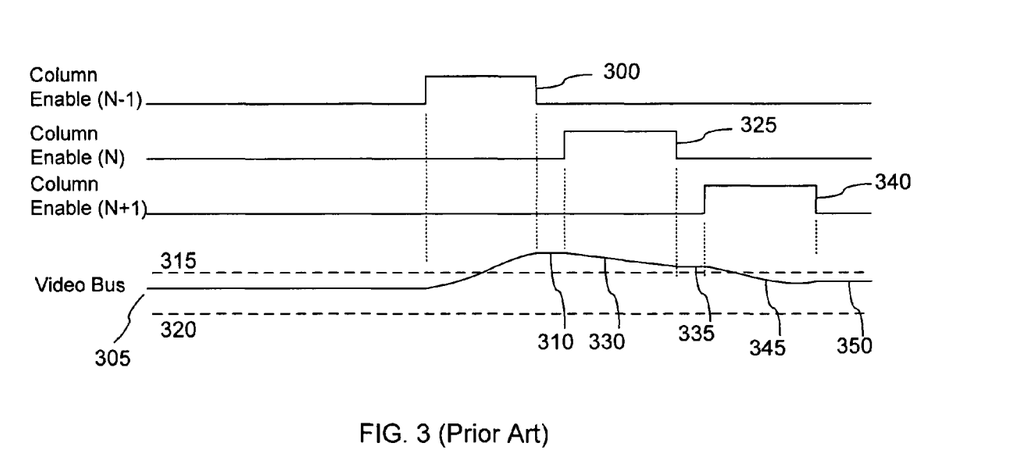
FIG. 3 is a prior art graph for the signal and charge levels while reading data with a defective column, related to FIG. 1.

FIG. 3 is a prior art graph for the signal and charge levels while reading data with a defective column, related to FIG. 1. In this example, column 10-1 is defective. Pulse 300 connects capacitor 25-1 with video bus capacitor 65. Video bus waveform 305 represents voltage across video bus capacitor 65 and point 310 represents the voltage after pulse 300 goes low. Point 310 is above boundary 315. Boundaries 315 and 320 represent the high and low limits of normal range, where photocharge to output voltage is approximately linear. Column filters (not shown) do not correct for errors introduced when voltage moves beyond the linear range. Column filtering is typically a mathematical operation that corrects charge readout in a charge-sharing architecture as opposed to reset readout.

Pulse 325 causes the readout for column 10-2, resulting in transition 330 in which the video bus voltage ends at point 335. Voltage on column 10-2 is determined by comparing voltage on video bus 60 at point 310 to point 335. Voltage is still above boundary 315, resulting in more corrupted data. Pulse 340 signals readout for column 10-3, resulting in transition 345 to point 350. Voltage on column 10-3 is determined by comparing voltage on video bus 60 at point 335 to point 350. Because point 335 is outside the linear range, an accurate value for voltage across column 10-3 cannot be determined. Many of the pixels on a row following a bad column will have corrupted data values due to the above reasons.

Another problem arises when rows are shorted together. When two rows are shorted together, either one gets pulled high which also pulls the other high, or one is pulled high while another is being pulled low, creating a conflict.

BRIEF DESCRIPTION OF THE INVENTION

The invention provides a method and apparatus for a column correction system. A charge-sharing readout bus architecture has a first column comprising the following. A storage transistor is coupled to a photodetector and configured to transfer charge from the photodetector. A storage capacitor is coupled to the storage transistor and is configured to store charge transferred from the photodetector. A select transistor is coupled to the storage capacitor and is configured to transfer charge from the storage capacitor. An address circuit is coupled to the first column through the gate of the select transistor and is configured to generate and decode an address and turn on the select transistor for the first column if the address matched the first column and if the address circuit received a corrected enable signal indicating that the first column is not defective. A correction circuit is coupled to the address circuit and is configured to generate the corrected enable signal indicating that the first column is not defective if the correction circuit was programmed to indicate that the first column is not defective.

The invention further provides a method and system for a row correction system. An imaging system with row correction comprises the following. The imaging system has a first row and an address circuit coupled to the first row, where the address circuit is configured to decode and generate an address. A correction circuit is coupled to the address circuit and is configured to place the first row at an assert level voltage, a deassert level voltage, or in an open state. The first row comprises the following. A photodetector is coupled to a readout means, where the readout means is configured to transfer charge from the photodetector. A select means is coupled to the readout means and the select means is configured to transfer charge from the readout means.

DETAILED DESCRIPTION OF THE INVENTION

Persons of ordinary skill in the art will realize that the following description of the invention is only illustrative and not in any way limiting. Other embodiments of this invention will be readily apparent to those skilled in the art having benefit of this disclosure.

One term of art is the "enable" signal that commonly refers to a signal that activates output from a row or column. The enable signal may be combined, by some logic, with a signal from a decoder in order to activate a given column, for example. With respect to the invention, the term "corrected enable" signal refers to the enable signal further combined (prior to combination with the decoder signal) with a signal indicating the column to be activated is operative, i.e. presumably non-defective. A list of defective columns is compared to the selected column and if the selected column is not on the list, then an assert signal combines with the enable signal (in the appropriate logic) to form the corrected enable signal. The corrected enable signal signifies that the selected column is not in the list of defective columns. The corrected enable signal then combines with a signal from the decoder, for example.

Figure 4:
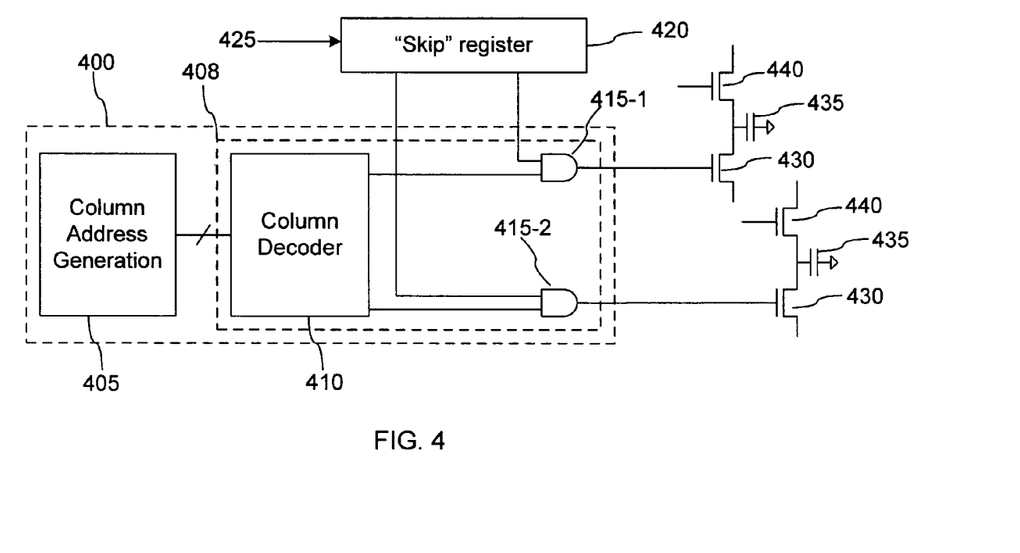
FIG. 4 a schematic diagram illustrating a column correction circuit.

FIG. 4 is a schematic diagram illustrating one embodiment of the invention. Address circuit 400 has address generator 405 and decoder circuit 408, which comprises decoder 410 and AND gates 415. An AND gate is a combinational circuit with at least two inputs. An AND gate is turned on, or asserted, when it receives a high voltage signal on all inputs and turned off, or deasserted, when it receives a low voltage signal on any one input. AND gates form one combinational circuit that selects columns based on addresses. Many other combinational circuits perform the same function and are not shown. For example, the address circuit may comprise a shift register (not shown).

Address generator 405 produces one or more addresses for columns selected for writing to a video bus. Output from AND gates 415 goes to select means, for example select transistors 430. Select transistors 430 couple to storage capacitors 435 and storage transistors 440. One input for AND gates 415 comes from decoder 410, after decoding the one or more addresses for columns from address generator 405. The other input for AND gates 415 comes from correction circuit 420. In this example, correction circuit 420 is a register that receives defective column information. In one embodiment, bad columns are stored in memory on the imager chip and loaded into a serial register upon initialization, for example through port 425. A controlling CPU could read out a list of defective columns, along with other needed data stored on the imager, and then serialize the defective column information and load it into correction circuit 420.

For example, if AND gate 415-1 couples to defective column one and AND gate 415-2 couples to operative column two, then correction circuit 420 is loaded so that its output lines to AND gates 415 drive voltage low on the input to AND gate 415-1 and drive voltage high on the input to AND gate 415-2. Correction circuit 420 sends a corrected enable signal to AND gates 415. Combined with control lines from decoder 410, AND gates 415 will turn on select transistors only when receiving a high signal from both decoder 410, corresponding the column coupled to the AND gate, and correction circuit 420, indicating that the column is to be activated and that the column is not defective.

In another embodiment, a list of bad columns is stored on off-imager chip memory. The list may be loaded into the correction circuit as described herein.

In a further embodiment, defective column information is programmed directly into non-volatile memory within correction circuit 420, eliminating the need to load it with information each time the imager is initialized.

With respect to the above example, column one would not pass charge to the video bus capacitor. Image processing within the imager (or, for example, after readout in the camera processor) could use the average of the last column charge loaded and the next operative column charge loaded. In another embodiment, the defective column is assigned the value of the previous operative column or the next operative column, without any averaging or combination. In yet another embodiment, an area-weighted average of neighboring pixels is used to determine the pixel values of the defective columns. Post-readout image processing may be skipped if pixel leakage and drift are low. If pixel leakage and drift are low, the capacitance of the video bus maintains the signal level set by the previous column, and the post-readout image processing may not be required.

Figure 12:
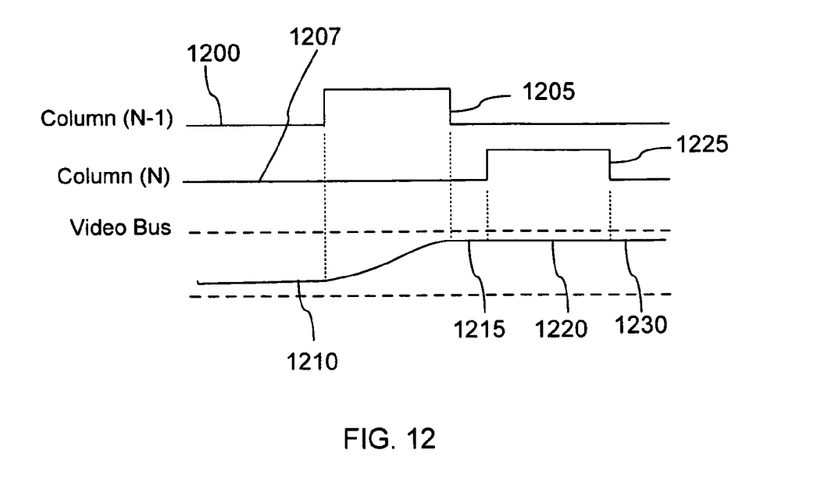
FIG. 12 is a graph illustrating signal and charge levels with low pixel leakage and drift while reading data with a defective column.

FIG. 12 is a graph illustrating signal and charge levels with low pixel leakage and drift. In this example, column 1200 is defective. Pulse 1205 (for column 1207) connects a capacitor (not shown) with a video bus capacitor (not shown). Video bus waveform 1210 represents voltage across the video bus capacitor and point 1215 represents the voltage after pulse 1205 goes low. Due to low pixel leakage and drift, voltage level 1220 during pulse 1225 stays at approximately the same level. In this case, when pulse 1225 goes low, point 1230 is at approximately the same voltage as point 1215, therefore post-image readout processing is not required.

Figure 5:
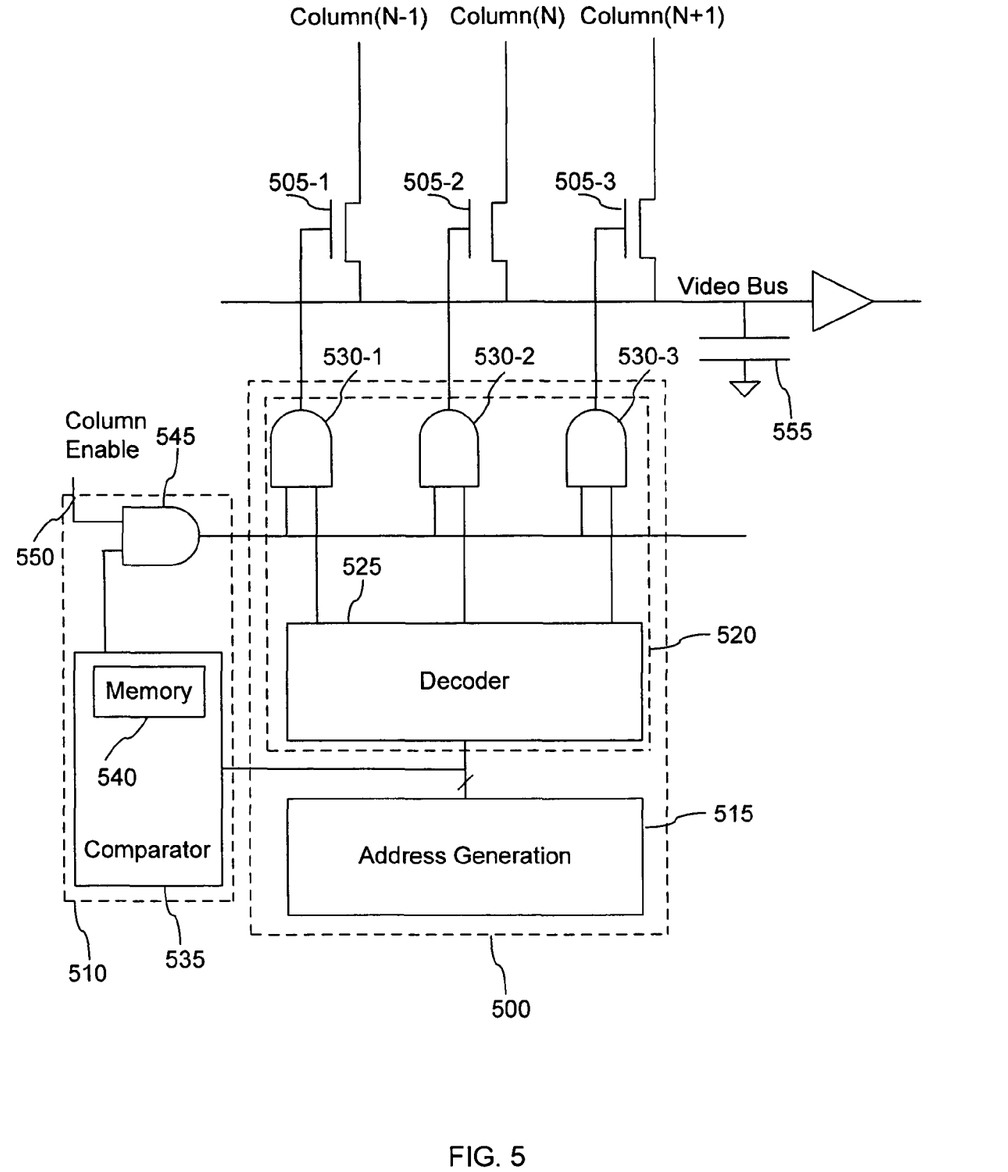
FIG. 5 a schematic diagram illustrating a column correction circuit.

FIG. 5 is a schematic diagram illustrating yet another embodiment of the invention. Address circuit 500 couples to select transistors 505. Correction circuit 510 receives address information from address circuit 500 and a column enable signal, and provides a corrected enable signal to address circuit 500.

Address circuit 500 comprises address generator 515 and decoder circuit 520. Address generator 515 provides addresses of columns selected for data transfer to decoder circuit 520 and correction circuit 510.

Decoder circuit 520 comprises decoder 525 and AND gates 530. Correction circuit 510 comprises comparator 535 coupled to memory 540 and AND gate 545. Memory 540 contains defective column information, either stored in non-volatile memory or loaded with each initialization of the imager.

Address generator 515 provides one or more addresses to decoder 525 and comparator 535. Decoder 525 decodes the one or more addresses and drives voltage on lines coupled to AND gates 530 high or low, depending on whether the column associated with a given AND gate was associated with the address.

Comparator 535 compares the one or more addresses with defective column information stored in memory 540. If the address does not match with any of the defective columns in memory 540 then input to AND gate 545 is driven high by comparator 535. If AND gate 545 receives high inputs from both comparator 535 and column enable line 550, then it drives a high output to AND gates 530. If AND gates 530 receive high voltage inputs from decoder 525, indicating a column select, and from AND gate 545, indicating the column is not defective, then AND gates 530 will drive high the input to select transistors 505. Any defective columns will therefore not have the associated select transistor activated and corrupted data will not be stored on video bus capacitor 555. While FIG. 5 illustrates one embodiment with three columns, one skilled in the art recognizes that the invention applies to a wide array of rows and columns.

Figure 6:
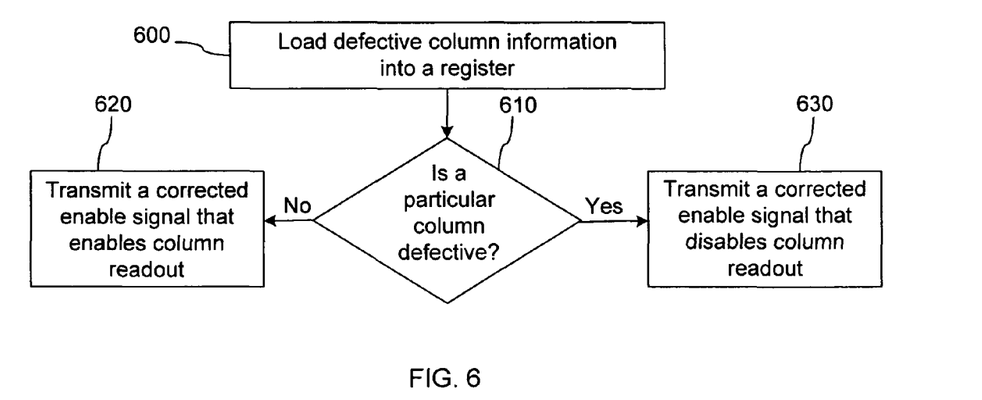
FIG. 6 is a flow diagram illustrating a method for correcting a defective column.

FIG. 6 is a flow diagram illustrating a method of correcting a defective column. In block 600, load defective column information in to a register. In block 610, determine whether or not a particular column is defective. In block 620, transmit a corrected enable signal that enables column readout if the column is not defective. In block 630, transmit a corrected enable signal that disables column readout if the column is defective.

Figure 7:
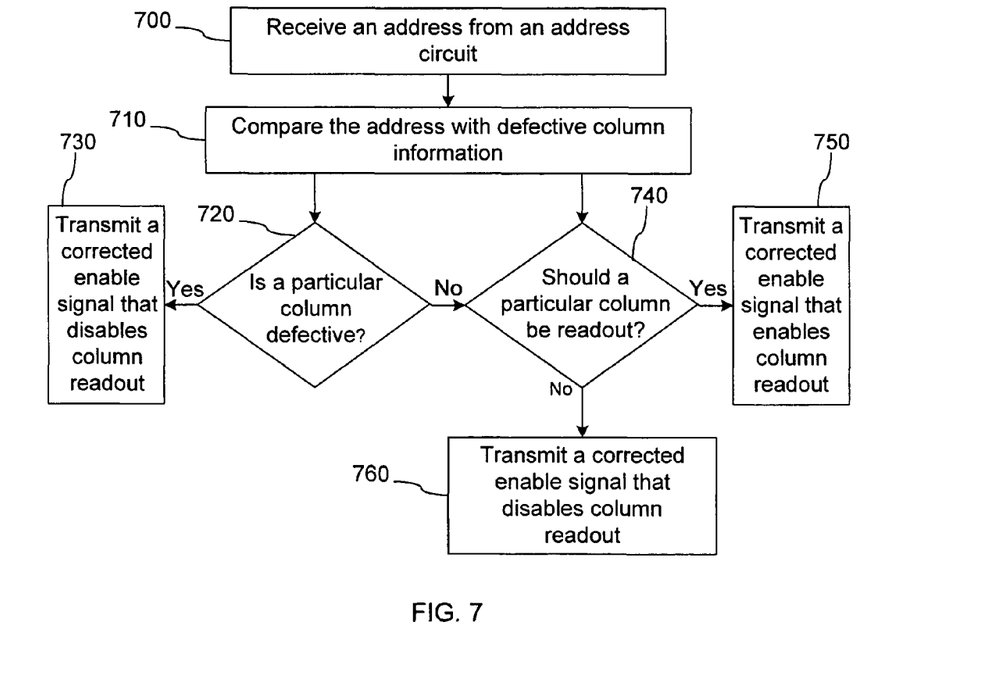
FIG. 7 is a flow diagram illustrating a method for correcting a defective column.

FIG. 7 is a flow diagram illustrating a method of correcting a defective column. In block 700, receive an address from an address circuit. In block 710, compare the address with defective column information. In block 720, determine whether or not a particular column is defective. If a particular column is defective then, in block 730, transmit a corrected enable signal that disables column readout. If a particular column is not defective then, in block 740, determine whether or not a column enable line indicates that the particular column should be readout. If a particular column should be readout then, in block 750, transmit a corrected enable signal that enables column readout. If a particular column should not be readout then, in block 760, transmit a corrected enable signal that disables column readout.

Figure 8:
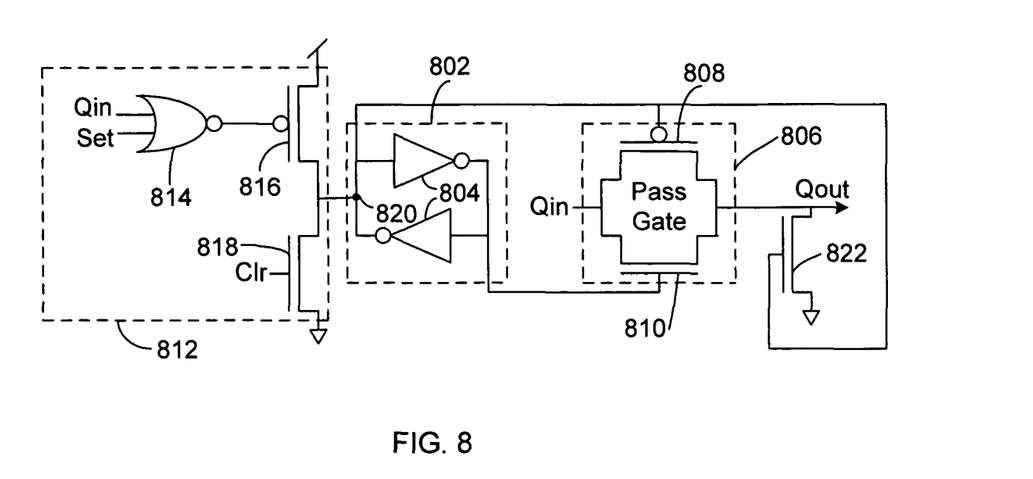
FIG. 8 is a schematic diagram illustrating a column bypass circuit.

FIG. 8 is a schematic diagram illustrating a column bypass circuit. The column bypass circuit contains a register, a method of setting/clearing the register, and a pass gate for allowing column data from each column to either be withheld or enabled onto the video bus depending on a value in the register. When the register is cleared, decoder output, for example Qin, is allowed through the pass gate and eventually enables column readout to the video bus. When the register is set, then the decoder output is disconnected from the column readout and the column does not read out to the video bus.

Column bypass circuit 800 is one embodiment of the column bypass circuit described above. Latch 802 is comprised of invertors 804. Pass gate 806 connects to latch 802 and is comprised of transistors 808 and 810. Pass gate 808 has an input of Qin (which is also decoder output) and an output of Qout. Program circuit 812 sets or clears latch 802. In one embodiment, program circuit includes NAND gate 814, and transistors 816 and 818. If invertors 804 are weak relative to programming circuit 812, then program circuit 812 may override node 820 and either clear or set latch 802. Asserting transistor 818 with the 'clr' signal clears latch 802. A desired decoder output, or Qin, becomes active and a global set signal, 'set,' are input to NAND gate 814. Qin and 'set' combine to assert transistor 816, which sets latch 802. In one embodiment, 'clr' is global. In another embodiment, 'clr' is a decoder selectable signal that is implemented in a manner similar to 'set.'

If latch 802 is cleared, then pass gate 808 transfers input Qin to output Qout, where it may later transfer to the video bus. If latch 802 is set, then pass gate 808 prevents input Qin from transferring to output Qout. Additionally, transistor 822 is asserted in order to prevent Qout from floating by pulling it to a low state.

Typically an image sensor employing the above column bypass circuit would send a 'clr' signal for all columns upon powerup. If the sensor has bad columns, the registers, or latch 802 in one embodiment, associated with the bad columns could be set in order to disable the bad columns. Otherwise, the registers are cleared and decoder output Qin passes through pass gate 806 to Qout.

Although the embodiment illustrated in FIG. 8 reduces the number of transistor, one skilled in the art will recognize that many different topologies are possible to implement the invention.

Figure 9:
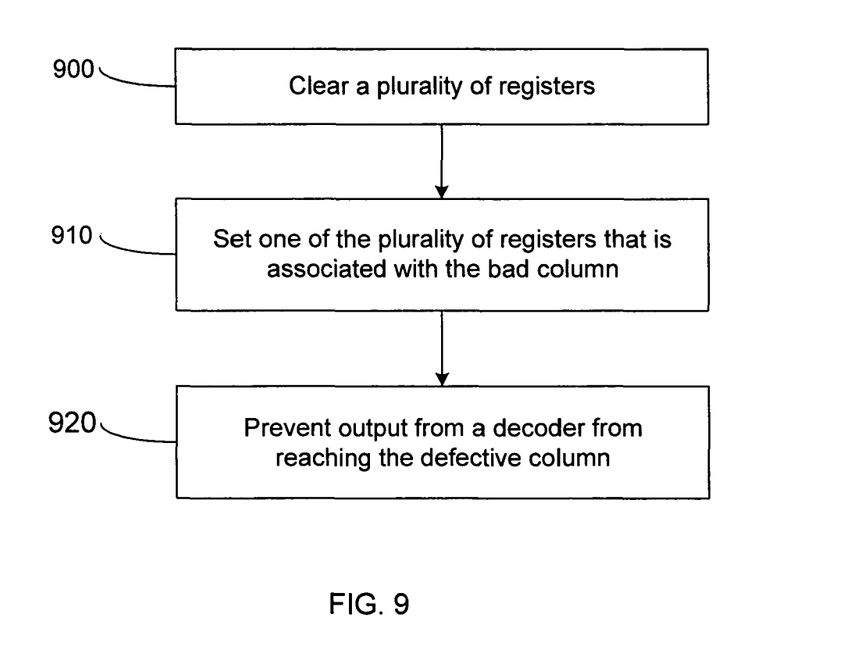
FIG. 9 is a flow diagram illustrating a method for bypassing a defective column.

FIG. 9 is a flow diagram illustrating a method for bypassing a defective column in a charge-sharing pixel readout bus architecture. In block 900, clear a plurality of registers. In block 910, set one or more of the plurality of registers that is associated with the bad column. In block 920, prevent output from a decoder from activating readout of the defective column.

The correction method and system could enhance the apparent yield on imager chips and reduce their cost, as well as improve image quality. Ultimately this could have an effect on the cost and image quality of digital cameras.

One type of defect in imagers is an electrical short between two or more row enable conductors. In addition to disrupting the image signal being read from the shorted rows, connecting two signals that are being driven to opposite logic levels may cause increased power consumption and even damage circuit elements or conductors. The effect of defective rows upon an image may be reduced if the shorted row wires are disabled with a high impedance mode driver (tristate). However disabling is done, the camera image processing software must be aware that the row is bad so that row correction software can be invoked. Rows may be tested upon initialization of system software (startup) or they may be tested at the factory and a list of rows with row defects stored in memory. Determining short and open defects is well known in the art.

Figure 10:
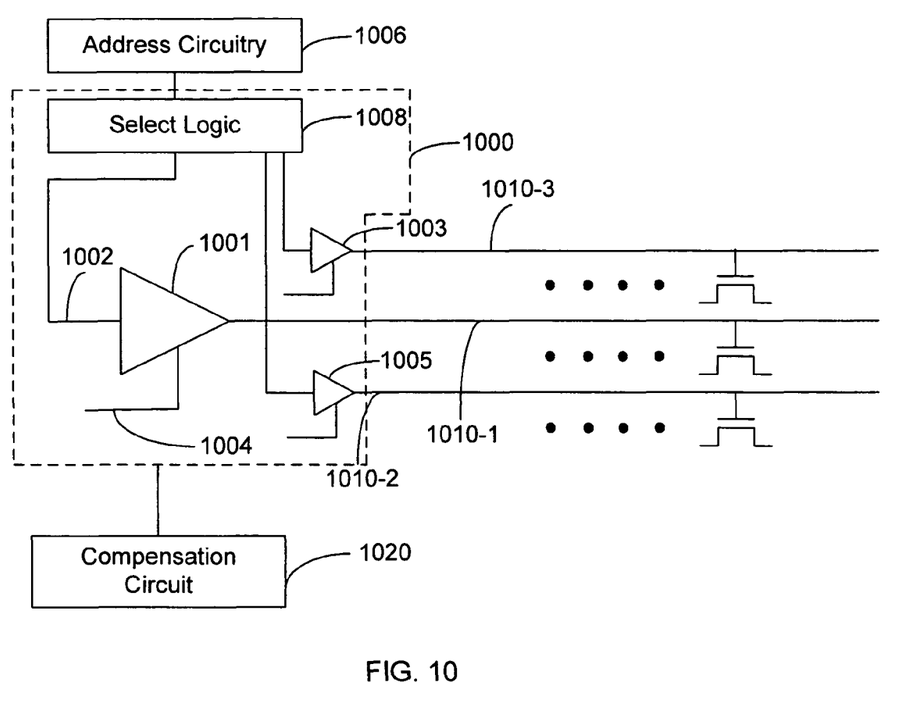
FIG. 10 is a block diagram illustrating a row correction circuit.

FIG. 10 is a block diagram illustrating a row correction circuit that is designed to compensate for a shorted defect. In one embodiment, correction circuit 1000 applies either an assert level voltage, a deassert level voltage, or puts into an open state one of rows 1010.

In another embodiment, correction circuit 1000 includes buffer 1001 and select logic 1008. Buffer 1001 has voltage input 1002 and enable 1004. In another embodiment, buffer 1001 is a tri-state, or three-state buffer and enable 1004 is a tri-state enable. Row 1010-2 is connected to buffer 1003 and row 1010-3 is connected to buffer 1005.

Buffers 1001, 1003, and 1005 connect to address circuit 1006 through select logic 1008. Address circuit 1006 decodes information indicating that a row should be activated. Address circuit 1006 generates an address for the row to be activated and select logic 1008 receives the address. Select logic 1008 compares the received address with, for example, an external or internal memory (not shown), or internally programmed logic, containing the addresses for rows with defects. If the address received by select logic 1008 fails to match an address in the list of row defects, then the row is presumably free of row defects and select logic 1008 sends an assert voltage level. If the address received by select logic 1008 matches an address in the list of row defects, then the row presumably is shorted to another row (defective) and select logic 1008 sends an assert voltage level to the currently selected row and a tri-state signal to the non-selected, shorted row. Select logic 1008 sends a deassert level voltage to all other rows.

For example, if select logic 1008 receives the address for row 1010-3, and if row 1010-3 is not a known defective row, then select logic 1008 sends an assert voltage level to buffer 1005, connected to row 1010-3. A typical assert voltage level is 1.7 to 2.2 [V]. The remaining rows, for example rows 1010-1 and 1010-2 receive deassert voltage levels. A typical deassert voltage level is −0.8 to 0 [V].

Continuing with the example, assume a shorted defect exists between rows 1010-1 and 1010-2. Address circuit 1006 decodes information indicating that row 1010-1 should be activated. Address circuit 1006 generates an address for row 1010-1 and select logic 1008 receives the address. Select logic 1008 matches the received address to an address for rows with defects because a shorted defect exists between rows 1010-1 and 1010-2. Select logic 1008 sends an assert voltage level to buffer 1001 which sends the assert voltage level to row 1010-1. A tri-state enable signal is sent to buffer 1005, connected to row 1010-2. Buffer 1005 puts row 1010-2 in an open state and allows assertion of row 1010-1 without asserting shorted row 1010-2. In one embodiment enable 1004 is connected to select logic 1008. The remaining rows, for example row 1010-3, receive deassert voltage levels.

In another embodiment, an assert level voltage is applied to row 1010-2 while row 1010-1 is held open with a signal from enable 1004. One of ordinary skill in the art will recognize that buffers 1001, 1003, and 1005 may be implemented with different components.

Figure 13:
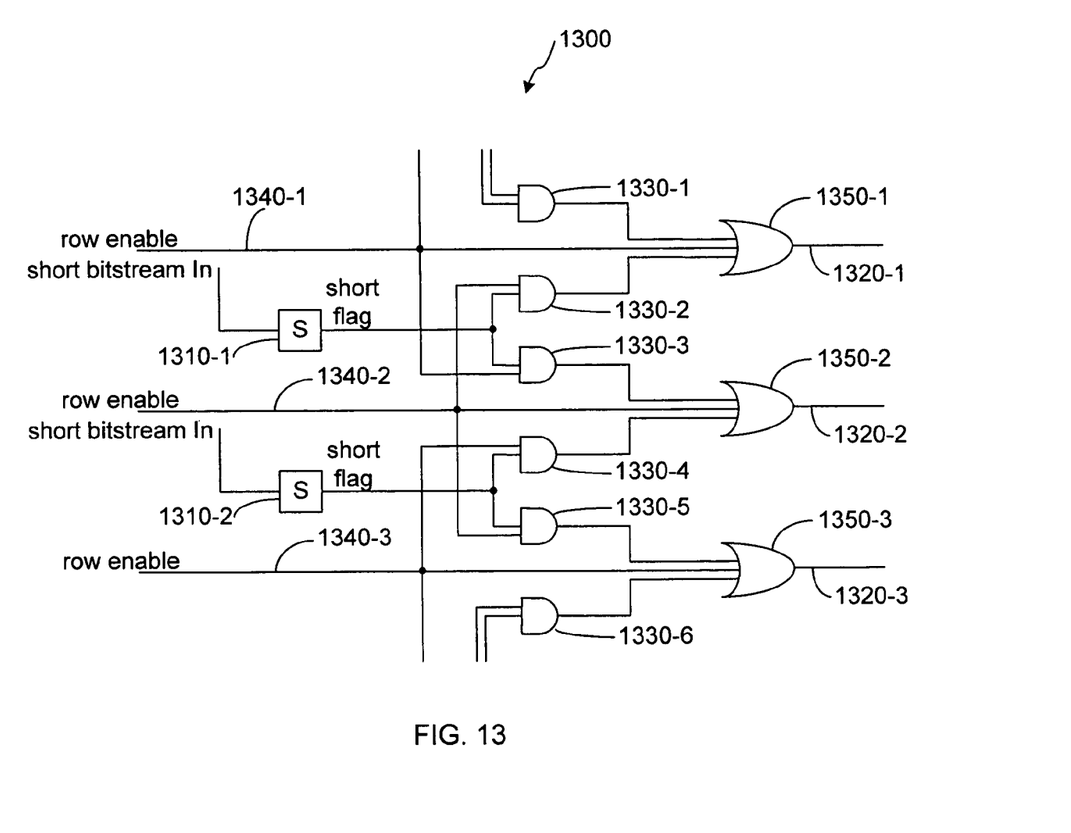
FIG. 13 is a schematic diagram illustrating an alternate embodiment of correction circuit 1000 of FIG. 10.

FIG. 13 is a schematic diagram illustrating an alternate embodiment of correction circuit 1000 of FIG. 10. Correction circuit 1300 includes flags 1310 that hold a bit value indicating shorted rows, for example rows 1320. AND gates 1330 receive input from flags 1310 and row enable lines 1340. OR gates 1350 receive input from AND gates 1330 and row enable lines 1340, and provide a corrected row enable signal on rows 1320. Flags 1310 may be one bit memory, for example.

In one example, rows 1320-1 and 1320-2 are shorted together. Flag 1310-1 is set, indicative of the short between rows 1320 1 and 2, and sends an assert signal to AND gates 1330-2 and 1330-3. Flag 1310-2 is cleared, as there is no short between rows 1320 2 and 3. A row enable (assert) signal is transmitted along line 1340-1 and received by OR gate 1350-1 and AND gate 1330-3. A row disable (deassert) signal is transmitted on lines 1340-2 and 1340-3. AND gate 1330-3 receives assert signals from both line 1340-1 and flag 1310-1, therefore sends an assert signal to OR gate 1350-2. AND gate 1330-4 receives deassert signals from line 1340-3 and flag 1310-2, therefore transmits a deassert signal to OR gate 1350-2. AND gate 1330-5 receives deassert signals from line 1340-2 and flag 1310-2, therefore transmits a deassert signal to OR gate 1350-3. OR gates 1350 1 and 2 both receive at least one assert signal, therefore they transmit the corrected enable (assert) signal on rows 1320 1 and 2, respectively. OR gate 1350-3 receives all deassert signals, therefore deasserts row 1320-3.

Next, a row enable (assert) signal is transmitted along line 1340-2 to AND gates 1330 2 and 5, and to OR gate 1350-2. A row disable (deassert) signal is transmitted on lines 1340-1 and 1340-3. AND gate 1330-2 receives an assert signal from line 1340-2 and flag 1310-1 (set previously because of the row short between lines 1320 1 and 2), therefore sends an assert signal to OR gate 1350-1. AND gate 1330-3 receives an assert signal from flag 1310-1 and a deassert signal from line 1340-1, therefore sends no assert signal. AND gate 1330-4 receives a deassert signal from flag 1310-2 and line 1340-3, therefore transmits a deassert signal to OR gate 1350-2. AND gate 1330-5 receives an assert signal from line 1340-2 and a deassert signal from flag 1310-2, therefore sends a deassert signal to OR gate 1350-3. OR gates 1350 1 and 2 both receive at least one assert signal, therefore they transmit the corrected enable signal on rows 1320 1 and 2, respectively. OR gate 1350-3 receives deassert signals, therefore deasserts row 1320-3.

Finally, a row enable (assert) signal is transmitted along line 1340-3 to AND gate 1330-4, and to OR gate 1350-3. A row disable (deassert) signal is transmitted on lines 1340-1 and 1340-2. AND gate 1330-4 receives an assert signal from line 1340-4 and a deassert signal from flag 1310-2 (cleared previously, indicating no row short), therefore transmits a deassert signal to OR gate 1350-2. AND gate 1330-5 receives a deassert signal from line 1340-2 and a flag 1310-2, therefore transmits a deassert signal to OR gate 1350-3. OR gate 1350-2 receives deassert signals, therefore deasserts row 1320-2. OR gate 1350-3 receives at least one assert signal (from line 1340-3) and therefore transmits the corrected enable signal on row 1320-3.

Figure 11:
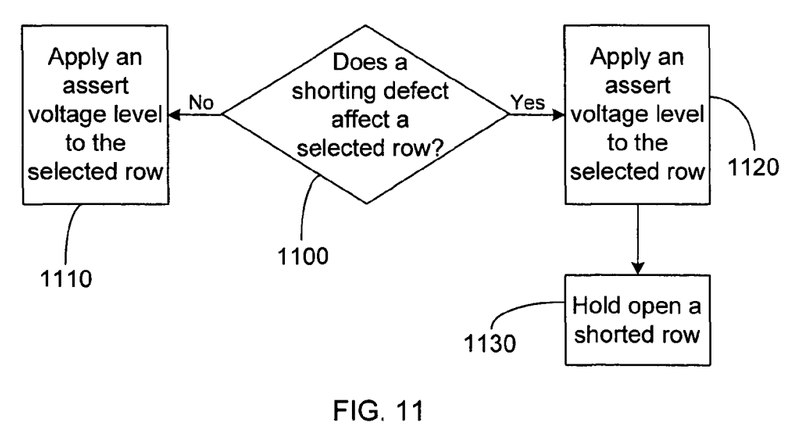
FIG. 11 is a flow diagram illustrating a method for correcting a defective row.

FIG. 11 is a flow diagram illustrating a method for correcting a defective row. In block 1100, determine whether a shorting defect affects a selected row. If a shorting defect does not affect a selected row, then in block 1110 apply an assert voltage level to the row. If a shorting defect does affect a selected row, then in block 1120 apply an assert voltage level to the selected row. In block 1130, hold open a shorted row, wherein the shorted row is connected to the selected row, causing the shorting defect.

Signal processing may further improve an image obtained with the invention.

While embodiments and applications of this invention have been shown and described, it would be apparent to those skilled in the art that many more modifications than mentioned above are possible without departing from the inventive concepts herein. Solutions with logic circuits are dynamic, meaning that many possible circuits will achieve the same result. It is not practical to produce an extensive list of logic circuit combinations, whether AND, NAND, XOR, or OR gates that could be used to implement the invention. Furthermore, those skilled in the art are aware that there are many equivalent circuits, for example those that replace P-channel for N-channel transistors, high voltage input for low voltage input, shift registers for address decoders, and so on, that practice the invention without using the embodiments described herein. The invention, therefore, is not to be restricted except in the spirit of the appended claims.

What is claimed is:

1. An imaging system of with column correction having a first column comprising:
    a photodetector;
    a readout means coupled to the photodetector and configured to transfer charge from the photodetector;
    a select means coupled to the readout means and configured to transfer charge from the readout means;
    an address circuit coupled to the first column through the select means and configured to compare an address to a plurality of addresses associated with the first column, and turn on the select means for the first column if the address matched one of the plurality of addresses associated with the first column and if the address circuit received a corrected enable signal indicating that the first column is not defective wherein the address circuit further comprises:
        an address generator configured to generate the address; and
        a decoder circuit coupled to the address generator and the first column through the gate of the select transistor, the decoder circuit configured to receive and decode the address and receive the corrected enable signal, and further configured to turn on the select means if the decoder received the corrected enable signal indicating that the first column is not defective and received the address that matched one of the plurality of addresses associated with the first column; and
    a correction circuit coupled to the address circuit and configured to generate the corrected enable signal indicating that the first column is not defective, wherein the correction circuit further comprises:
        a register coupled to the decoder circuit and configured to receive defective column information and output to the decoder the corrected enable signal.

2. The system of claim 1 wherein the register is configured to receive defective column information and output the corrected enable signal such that the decoder circuit receives a corrected enable signal indicating that the first column is not defective if the defective column information indicates that the first column is not defective, and output the corrected enable signal such that the decoder circuit receives a corrected enable signal indicating that the first column is defective if the defective column information indicates that the first column is defective.

3. The system of claim 2 wherein the decoder circuit further comprises:
    a decoder; and
    a combinational circuit coupled to the decoder, to the register, and to the first column, wherein the combinational circuit is configured to receive an asserted signal from the register if the first column is not defective, corresponding to the corrected enable signal indicating that the first column is not defective, and a deasserted signal from the register if the first column is defective, corresponding to the corrected enable signal indicating that the first column is defective.

4. The system of claim 3 wherein the readout means comprises a transistor.

5. The system of claim 4 wherein the select means comprises a transistor.

6. The system of claim 5 wherein the combinational circuit comprises an AND gate.

7. An imaging system of with column correction having a first column comprising:

a photodetector;

a readout means coupled to the photodetector and configured to transfer charge from the photodetector;

a select means coupled to the readout means and configured to transfer charge from the readout means;

an address circuit coupled to the first column through the select means and configured to compare an address to a plurality of addresses associated with the first column, and turn on the select means for the first column if the address matched one of the plurality of addresses associated with the first column and if the address circuit received a corrected enable signal indicating that the first column is not defective wherein the address circuit further comprises:

an address generator configured to generate the address; and a decoder circuit coupled to the address generator and the first column through the gate of the select transistor, the decoder circuit configured to receive and decode the address and receive the corrected enable signal, and further configured to turn on the select means if the decoder received the corrected enable signal indicating that the first column is not defective and received the address that matched one of the plurality of addresses associated with the first column, said decoder circuit comprising:

a decoder; and a first combinational circuit coupled to the decoder, to the compare circuit, and to the first column, wherein the combinational circuit is configured to receive an asserted signal from the compare circuit if the first column is not defective, corresponding to the corrected enable signal indicating that the first column is not defective, and a deasserted signal from the compare circuit if the first column is defective, corresponding to the corrected enable signal indicating that the first column is defective; and a correction circuit coupled to the address circuit and configured to generate the corrected enable signal indicating that the first column is not defective, wherein the correction circuit further comprises:

a memory configured to maintain defective column information; and a compare circuit coupled to the memory and the address generator, and configured to compare the address with the defective column information and generate a corrected enable signal indicating whether or not the first column is defective.

8. The system of claim 7 wherein the correction circuit further comprises a second combinational circuit coupled to the compare circuit, to the first combinational circuit, and to a column enable line, the second combinational circuit configured to receive an assert signal from the compare circuit if the first column is not defective, corresponding to the corrected enable signal indicating that the first column is not defective, and a deassert signal from the register if the first column is defective, corresponding to the corrected enable signal indicating that the first column is defective, the second combinational circuit further configured to receive a column enable signal from the column enable line.

9. The system of claim 8 further comprising a second column coupled to the correction circuit, the second combinational circuit configured to receive an assert signal from the compare circuit if the second column is not defective, and a deassert signal from the register if the second column is defective.

10. The system of claim 8 wherein the first combinational circuit is configured to turn on the select means if the address matches one of the plurality of addresses associated with the first column, the defective column information indicates that the first column is not defective, and the column enable signal is asserted.

11. The system of claim 10 wherein the readout means comprises a transistor.

12. The system of claim 11 wherein the select means comprises a transistor.

13. The system of claim 12 wherein the first combinational circuit comprises a first AND gate.

14. The system of claim 13 wherein the second combinational circuit comprises a second AND gate.

15. An imaging system with column correction having:

a first column comprising:

a photodetector;

a readout means coupled to the photodetector and configured to transfer charge from the photodetector, said readout means comprising:

a video bus coupled to each column through the select means;

a video bus storage capacitor coupled to the video bus and configured to receive charge through the video bus from the readout means; and an amplifier coupled to receive charge from the video bus capacitor and transfer the charge to an output;

a select means coupled to the readout means and configured to transfer charge from the readout means;

an address circuit coupled to the first column through the select means and configured to compare an address to a plurality of addresses associated with the first column, and turn on the select means for the first column if the address matched one of the plurality of addresses associated with the first column and if the address circuit received a corrected enable signal indicating that the first column is not defective; and a correction circuit coupled to the address circuit and configured to generate the corrected enable signal indicating that the first column is not defective; and a second column, wherein the video bus capacitor is coupled to the first and second column through the video bus, the video bus capacitor further configured to receive charge from the first column if the address circuit coupled to the first column matches with one of the plurality of addresses associated with the first column and if the correction circuit coupled to the address circuit determines that the first column is not defective, the video bus capacitor further configured to not receive charge from the second column if the address circuit coupled to the second column matches with one of a plurality of addresses associated with the second column and if the correction circuit coupled to the address circuit determines that the second column is defective.

16. The system of claim 15 wherein the readout bus architecture is configured to transfer charge from the video bus capacitor to the output after charge transfers from the first column to the video bus capacitor, and the readout bus architecture is configured to transfer charge from the video bus capacitor to the output after charge does not transfer from the second column to the video bus capacitor.

17. The system of claim 16 wherein the readout means comprises a transistor.

18. The system of claim 17 wherein the select means comprises a transistor.

* * * * *